(12) United States Patent
Antao et al.

(10) Patent No.: US 10,325,582 B2
(45) Date of Patent: Jun. 18, 2019

(54) TRANSDUCER MOUNTING ASSEMBLY

(71) Applicant: NAVICO HOLDING AS, Egersund (NO)

(72) Inventors: Barry M. Antao, Owasso, OK (US); Jeremy Schroeder, Sapulpa, OK (US)

(73) Assignee: NAVICO HOLDING AS, Egersund (NO)

( * ) Notice: Subject to any disclaimer, the term of this patent is extended or adjusted under 35 U.S.C. 154(b) by 427 days.

(21) Appl. No.: 15/222,202

(22) Filed: Jul. 28, 2016

(65) Prior Publication Data
US 2018/0033417 A1 Feb. 1, 2018

(51) Int. Cl.
| | |
|---|---|
| *E21B 47/16* | (2006.01) |
| *G10K 11/00* | (2006.01) |
| *G01D 11/30* | (2006.01) |
| *G01S 7/62* | (2006.01) |
| *G01S 15/96* | (2006.01) |
| *G01S 15/89* | (2006.01) |
| *G01S 7/521* | (2006.01) |

(52) U.S. Cl.
CPC ............ *G10K 11/006* (2013.01); *G01D 11/30* (2013.01); *G01S 7/521* (2013.01); *G01S 7/62* (2013.01); *G01S 15/89* (2013.01); *G01S 15/96* (2013.01)

(58) Field of Classification Search
None
See application file for complete search history.

(56) References Cited

U.S. PATENT DOCUMENTS

| | | | | |
|---|---|---|---|---|
| 3,780,220 | A * | 12/1973 | Fugitt | B63C 11/48 348/81 |
| 5,088,068 | A * | 2/1992 | Schaill | G10K 11/006 181/124 |
| 5,186,428 | A * | 2/1993 | Falkenberg | G10K 11/006 248/284.1 |
| 5,297,109 | A * | 3/1994 | Barksdale, Jr. | E02B 17/0034 367/104 |

(Continued)

OTHER PUBLICATIONS

Lowrance Kayak Scupper Transducer Mount; <http://www.austinkayak.com/products/8561/Lowrance-Kayak-Scupper-Transducer-Mount.html> retrieved Jul. 28, 2016.

(Continued)

*Primary Examiner* — Isam A Alsomiri
*Assistant Examiner* — Jonathan D Armstrong
(74) *Attorney, Agent, or Firm* — Nelson Mullins Riley & Scarborough LLP

(57) ABSTRACT

A mounting assembly may effectively mount a transducer and a marine electronic display via the same mounting assembly. In order to mount the mounting assembly, the mounting assembly may be configured to utilize a hole or a surface of a watercraft without needing any additional fastening elements (e.g., screw or bolts) being attached to or inserted into the hole or watercraft. Accordingly, no screw holes are required in order to mount either the marine electronic display or the transducer. Thereby, the user may put the mounting assembly through the hole or attach it to a surface of the watercraft, and then attach the marine electronic display and transducer to the appropriate components of the mounting assembly. Thereby, the mounting of a transducer and a marine electronic display will take less time and require less parts.

19 Claims, 10 Drawing Sheets

(56) References Cited

U.S. PATENT DOCUMENTS

| | | | | |
|---|---|---|---|---|
| 5,661,466 | A * | 8/1997 | Pearson | G01D 5/1655 |
| | | | | 180/444 |
| 6,269,763 | B1 * | 8/2001 | Woodland | A62C 29/00 |
| | | | | 114/144 A |
| 6,276,503 | B1 * | 8/2001 | Laughlin, Jr. | B65H 75/403 |
| | | | | 191/12.2 A |
| 8,300,499 | B2 | 10/2012 | Coleman et al. | |
| 8,305,840 | B2 | 11/2012 | Maguire | |
| 9,268,020 | B2 | 2/2016 | Coleman | |
| 2006/0108022 | A1 * | 5/2006 | Carter | B65B 39/12 |
| | | | | 141/340 |
| 2008/0099414 | A1 * | 5/2008 | Haslem | B01D 17/0214 |
| | | | | 210/800 |
| 2008/0299842 | A1 * | 12/2008 | Ellis | B63B 35/71 |
| | | | | 440/6 |
| 2013/0016588 | A1 * | 1/2013 | O'Dell | G10K 11/006 |
| | | | | 367/173 |
| 2018/0001986 | A1 * | 1/2018 | Nutz | B63H 16/20 |
| 2018/0033417 | A1 * | 2/2018 | Antao | G10K 11/006 |

OTHER PUBLICATIONS

U.S. Appl. No. 14/717,458, entitled "Sonar Systems and Methods Using Interferometery and/or Beamforming for 3D Imaging," filed May 20, 2015.

* cited by examiner

TRANSDUCER MOUNTING ASSEMBLY

FIELD OF THE INVENTION

Embodiments of the present invention relate generally to a mounting assembly for mounting a transducer.

BACKGROUND OF THE INVENTION

Sonar is useful on various types of watercraft in order to detect waterborne or underwater objects. For example, sonar may be used to determine depth, bottom topography, detect fish, etc. A transducer receives reflected sound energy from the underwater environment. The sound energy is processed to be displayed in graphical form on a marine electronic display, giving a user a "picture" of the underwater environment (e.g., displays the distance to and/or location of the waterborne or underwater objects).

A user, while fishing or operating a watercraft, may wish to utilize sonar to view an image of the underwater environment. Accordingly, embodiments of the present invention describe assemblies and associated methods for utilizing a transducer, such as while fishing or operating a watercraft.

BRIEF SUMMARY OF THE INVENTION

In order to mount and make the marine electronic display operational, the marine electronic display may, in some cases, be screwed or fixed into the hull of a watercraft and may be connected by a wire or cable to the transducer that, in some cases, can be fixedly attached (e.g., screwed or bolted) on the bottom of the hull of the watercraft. In order to provide power to the marine electronic display and transducer, a battery may, in some cases, be placed in a separate portion of the watercraft and connected to the marine electronic display and transducer via cables or wires. Accordingly, a user may have to separately mount the transducer and the marine electronic display on to the watercraft and run cables throughout the watercraft. Further, some transducer mountings require the use of screws that are drilled into the hull of the watercraft. Moreover, a user may wish to use the transducer or marine electronic display while not using a watercraft, such as when ice fishing or the like.

Accordingly, example embodiments of the present invention provide for a mounting assembly that is configured to mount both a transducer and a marine electronic display in a single assembly that can be utilized in a hole or with respect to a watercraft. In some cases, the mounting assembly may be mounted on a surface of the watercraft. In other cases, in order to mount the mounting assembly, the mounting assembly may utilize a hole, such as an ice fishing hole or a scupper hole of a kayak.

In some embodiments, a mounting assembly may be provided. The mounting assembly may include a hollow tube configured to fit within a hole. The hollow tube may define a first end and a second end, and the hollow tube may further define at least one mounting leg proximate the second end. The mounting assembly may also include a marine electronic display mounting device coupled proximate the first end of the hollow tube. The marine electronic display mounting device may be configured to removably receive and mount a marine electronic display. The mounting assembly may further include a transducer mounting device rotatably connected to the at least one mounting leg. The transducer mounting device may be configured to rotate between a first position and a second position. The transducer mounting device may be further configured to removably receive and mount at least one transducer, and the transducer mounting device may be sized to fit within the hole when the transducer mounting device is in the second position such that the transducer mounting device may be passed through the hole with the hollow tube to a position past a bottom of the hole so as to enable the transducer mounting device to rotate to the first position. The mounting assembly may further include a locking device that may be configured to engage a portion of the hollow tube proximate a top of the hole in order to secure the hollow tube within the hole.

In some embodiments, when the transducer mounting device is in the first position, a longitudinal axis of a body of the transducer mounting device may be perpendicular to a longitudinal axis of the hollow tube. A length of the body of the transducer mounting device may be greater than a diameter of the hole such that when the transducer mounting device is in the first position, the body of the transducer mounting device may be prevented from being pulled through the hole.

In some embodiments, when the transducer mounting device is in the second position, the longitudinal axis of the body of the transducer mounting device may be parallel to the longitudinal axis of the tube. A width of the body of the transducer mounting device may be less than the diameter of the hollow tube such that when the transducer mounting device is in the second position, the body of the transducer mounting device may be enabled to pass through the hole.

In some embodiments, the locking device and the transducer mounting device may engage a top and a bottom of the hole respectively to secure the mounting assembly within the hole without the use of fasteners or adhesives.

In some embodiments, the transducer mounting device may define an opening to enable a cable of the transducer mounted thereto to be passed through the opening into an interior of the hollow tube and to a marine electronic display mounted to the marine electronic display mounting device.

In some embodiments, the hollow tube may be configured to enable a battery to be mounted within an interior of the hollow tube.

In some embodiments, the hollow tube may be configured to enable a battery to be mounted on an exterior surface of the hollow tube via at least one of a tray, a hanger, a hook, a hook-and-latch fastener, or a zip tie.

In some embodiments, the mounting assembly may further include a rotatable cap positioned on the first end of the hollow tube. The mounting assembly may even further include a rod positioned within an interior of the hollow tube and defining a first end and a second end. The first end of the rod may be operably coupled to the rotatable cap. The second end of the rod may be configured to be coupled to a transducer. The transducer may be rotatably mounted to the transducer mounting device, and in response to the rotatable cap being rotated by a user, the rod may rotate about an axis of rotation to cause a corresponding rotation of the transducer.

In some embodiments, the rod may be a hollow rod.

In some other embodiments, a system may be provided. The system may include a mounting assembly. The mounting assembly may include a hollow tube configured to fit within a hole. The hollow tube may define a first end and a second end, and the hollow tube may further define at least one mounting leg proximate the second end. The mounting assembly may also include a marine electronic display mounting device coupled proximate the first end of the hollow tube. The marine electronic display mounting device may be configured to removably receive and mount a marine electronic display. The mounting assembly may further include a transducer mounting device rotatably connected to the at least one mounting leg. The transducer mounting device may be configured to rotate between a first position and a second position. The transducer mounting device may be further configured to removably receive and mount at least one transducer, and the transducer mounting device may be sized to fit within the hole when the transducer mounting device is in the second position such that the transducer mounting device may be passed through the hole with the hollow tube to a position past a bottom of the hole so as to enable the transducer mounting device to rotate to the first position. The mounting assembly may further include a locking device that may be configured to engage a portion of the hollow tube proximate a top of the hole in order to secure the hollow tube within the hole. The system may also include a marine electronic display mounted to the marine electronic display mounting device.

In some other embodiments, a method for manufacturing a mounting assembly may be provided. The method may include providing a hollow tube configured to fit within a hole. The hollow tube may define a first end and a second end. The hollow tube further may further define at least one mounting leg proximate the second end. The method may also include coupling a marine electronic display mounting device proximate the first end of the hollow tube. The marine electronic display mounting device may be configured to removably receive and mount a marine electronic display. The method may further include rotatably connecting a transducer mounting device to the at least one mounting leg. The transducer mounting device may be configured to rotate between a first position and a second position. The transducer mounting device may be further configured to removably receive and mount at least one transducer. The transducer mounting device may be sized to fit within the hole when the transducer mounting device is in the second position such that the transducer mounting device can be passed through the hole with the hollow tube to a position past a bottom of the hole so as to enable the transducer mounting device to rotate to the first position. The method may further include providing a locking device that may be configured to engage a portion of the hollow tube proximate a top of the hole in order to secure the hollow tube within the hole.

BRIEF DESCRIPTION OF THE DRAWINGS

Figure 1:
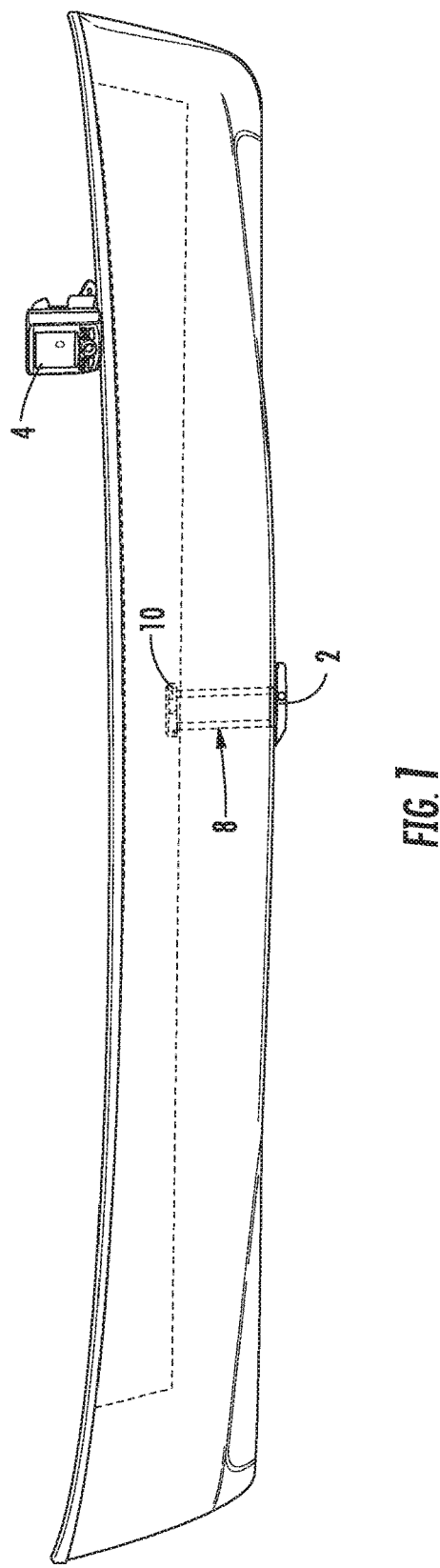
Figure 2:
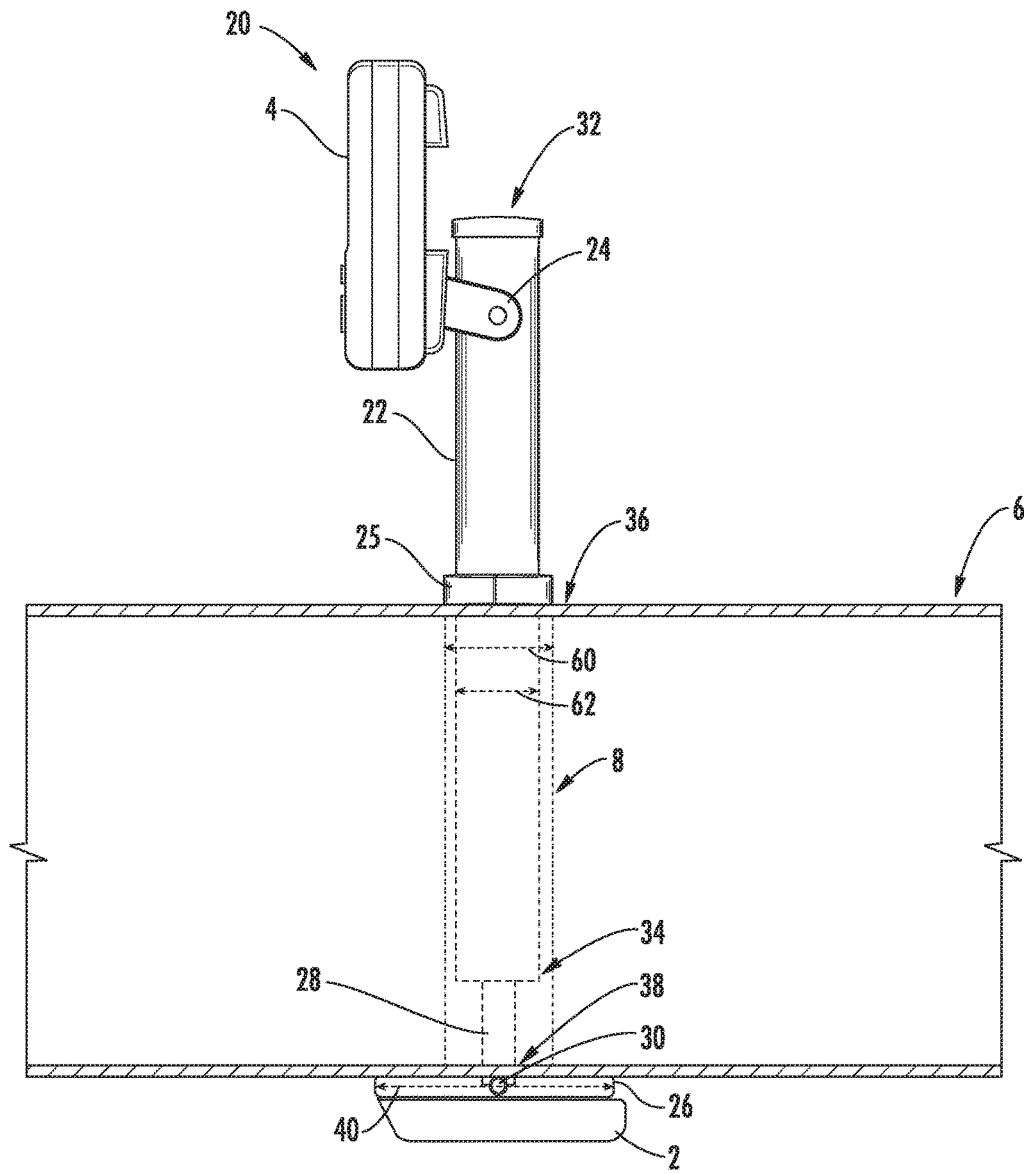
Figure 3:
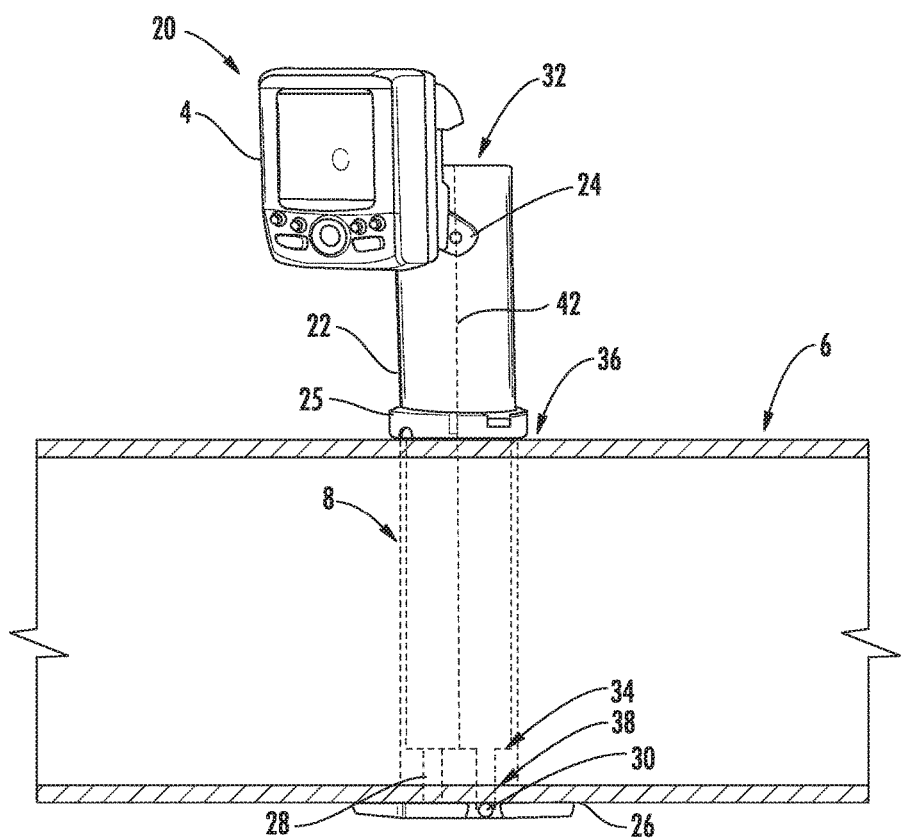
Figure 4:
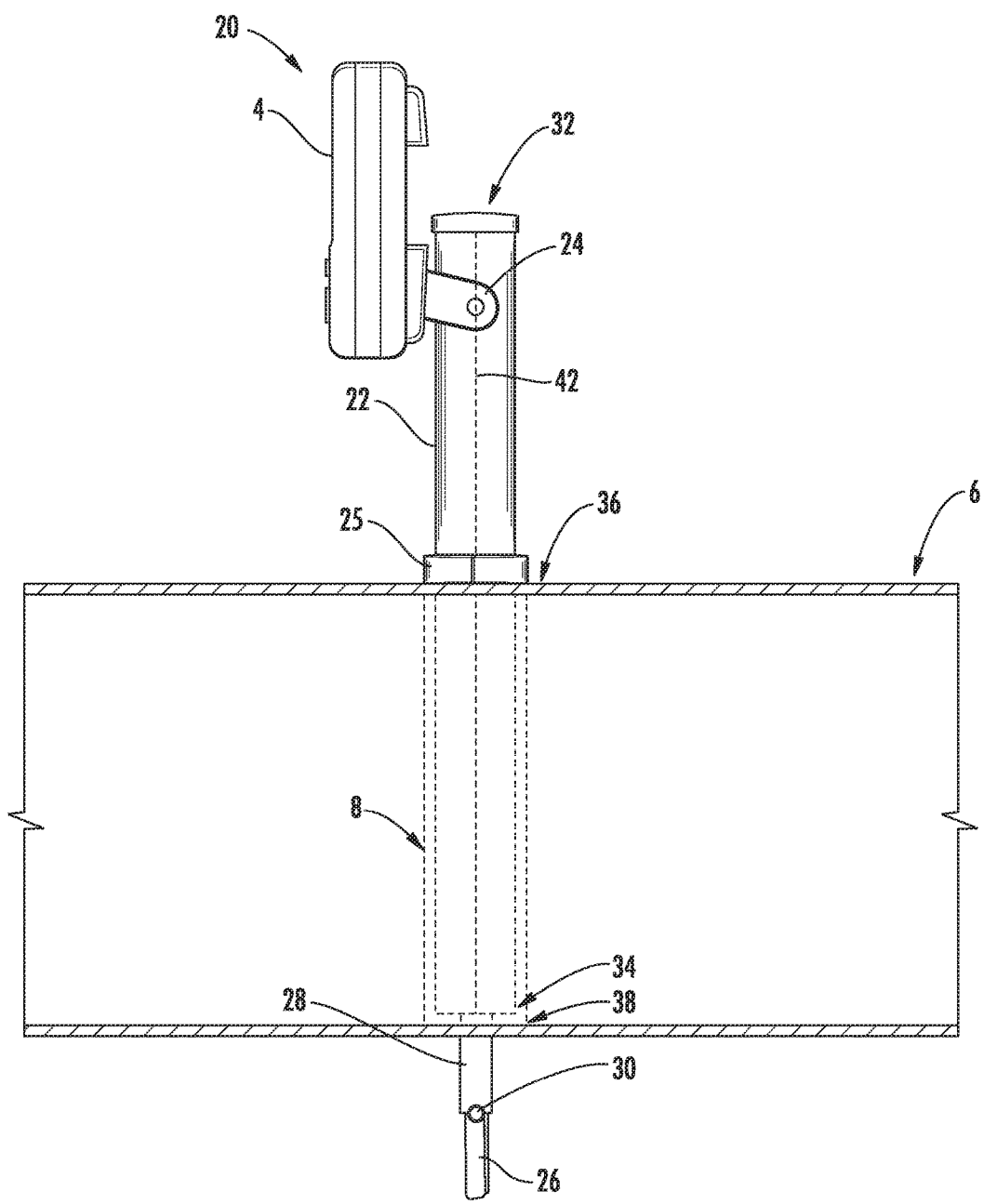
Figure 5A:
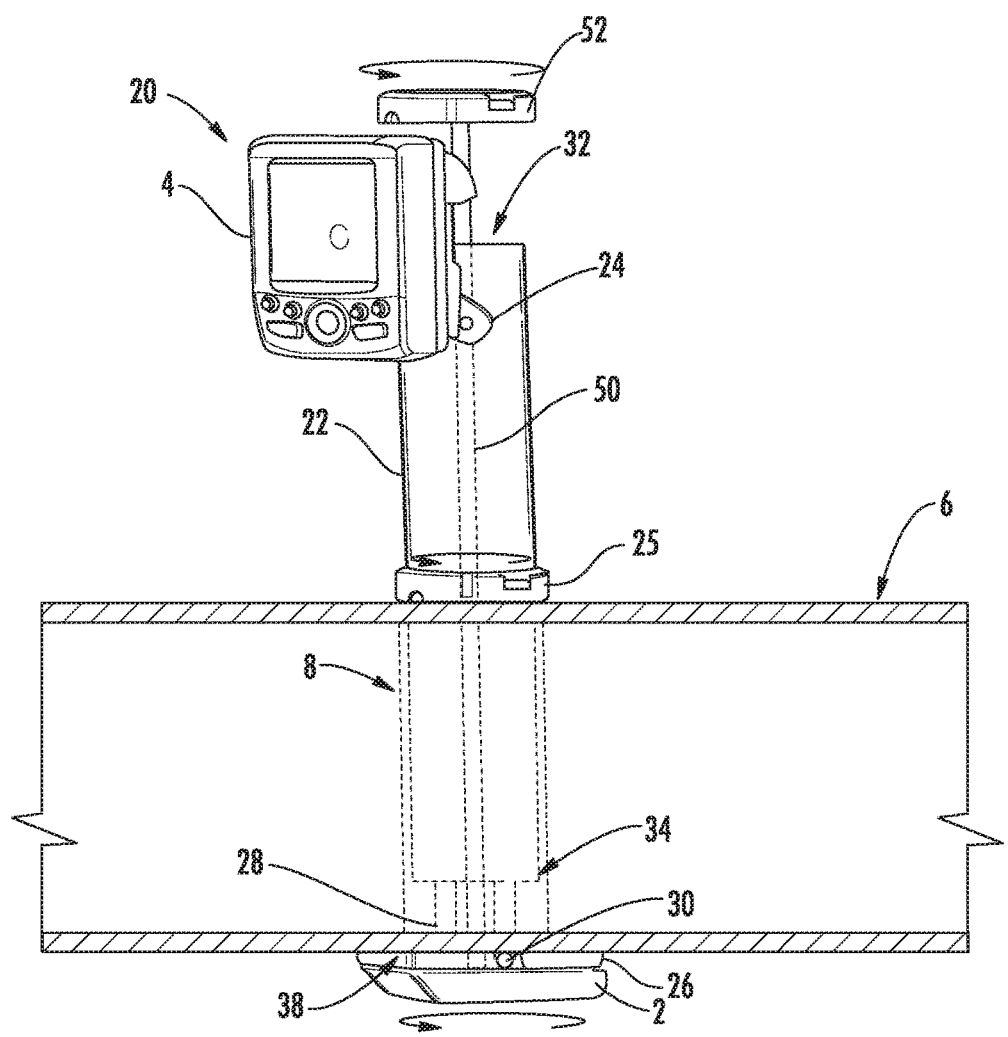
Figure 5B:
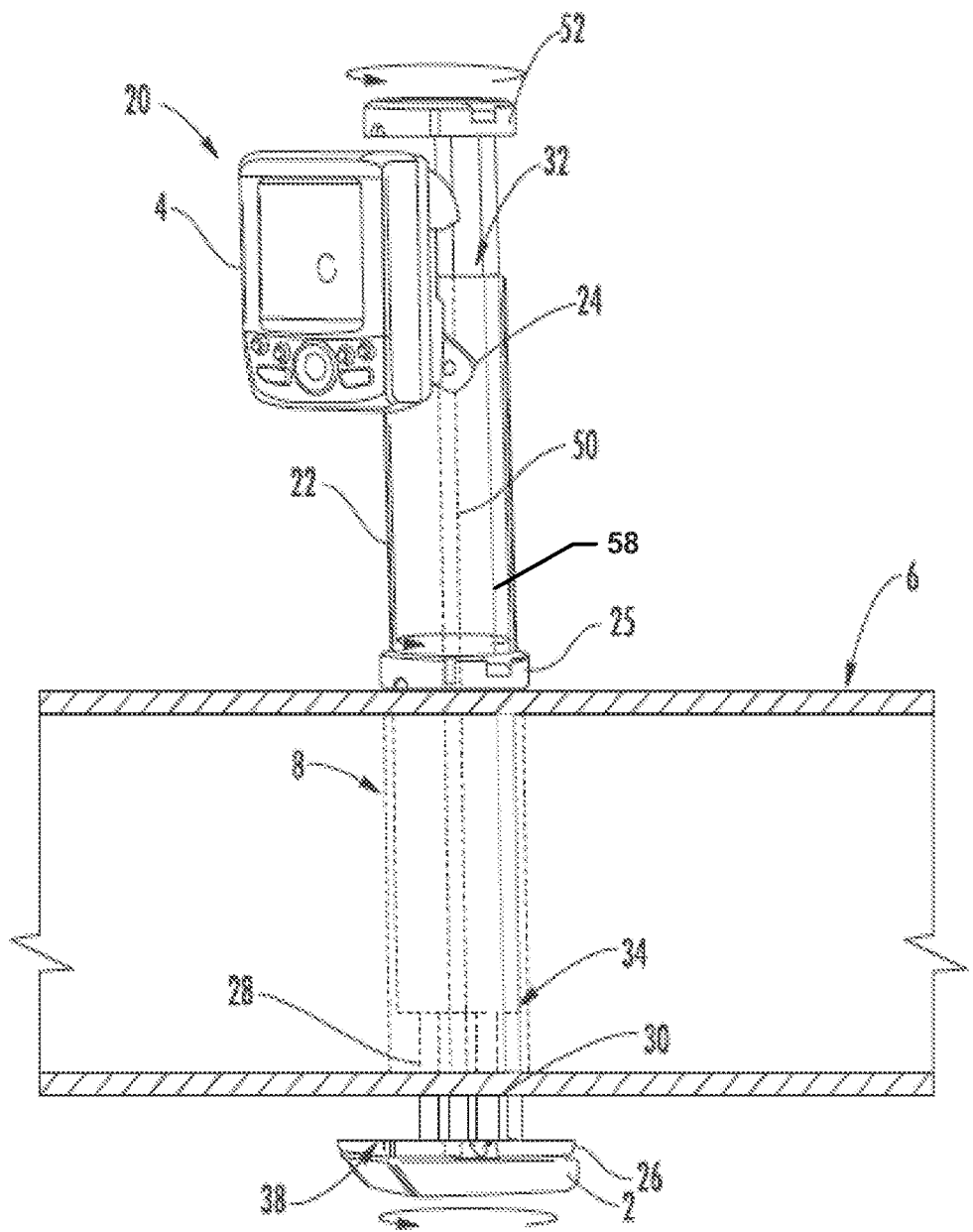
Figure 5C:
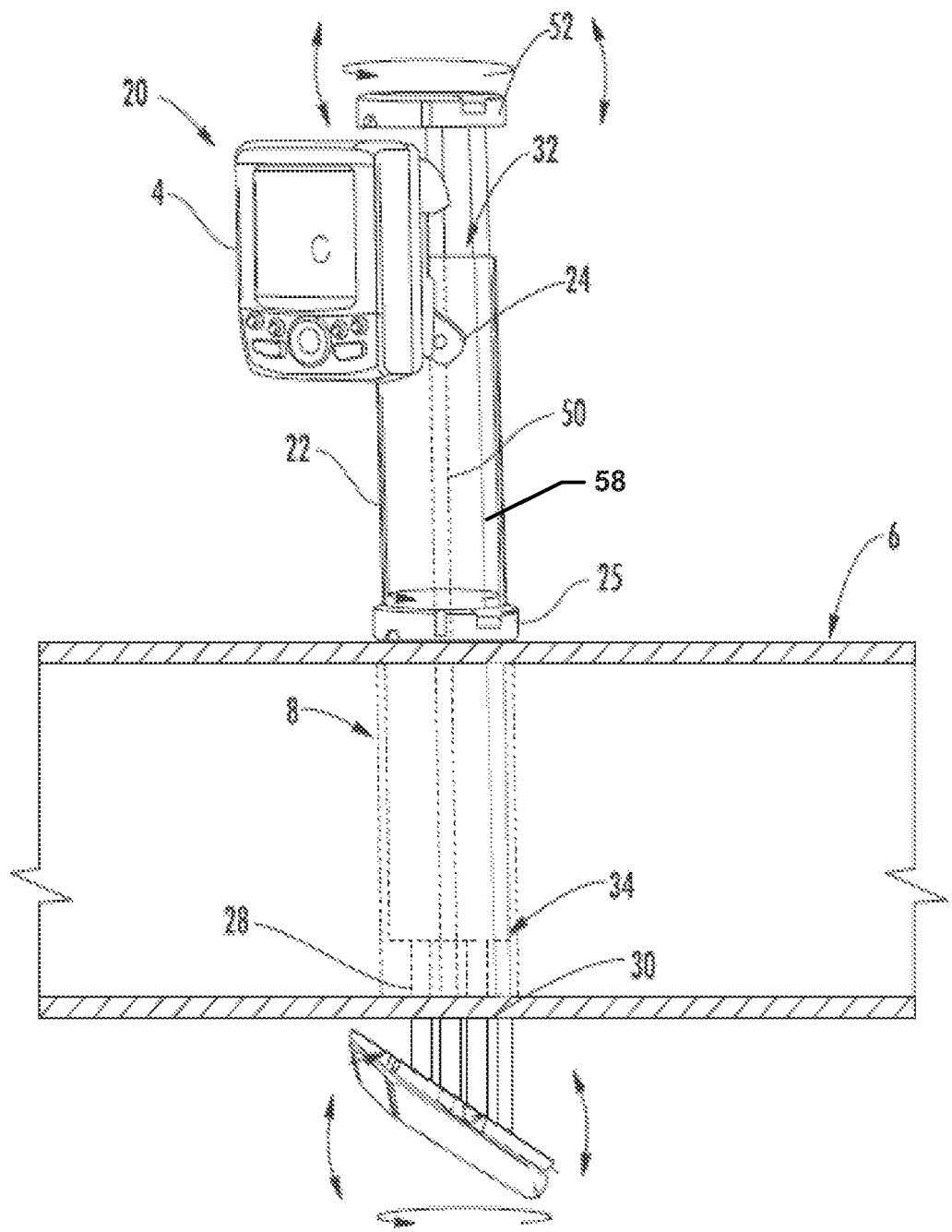
Figure 6:
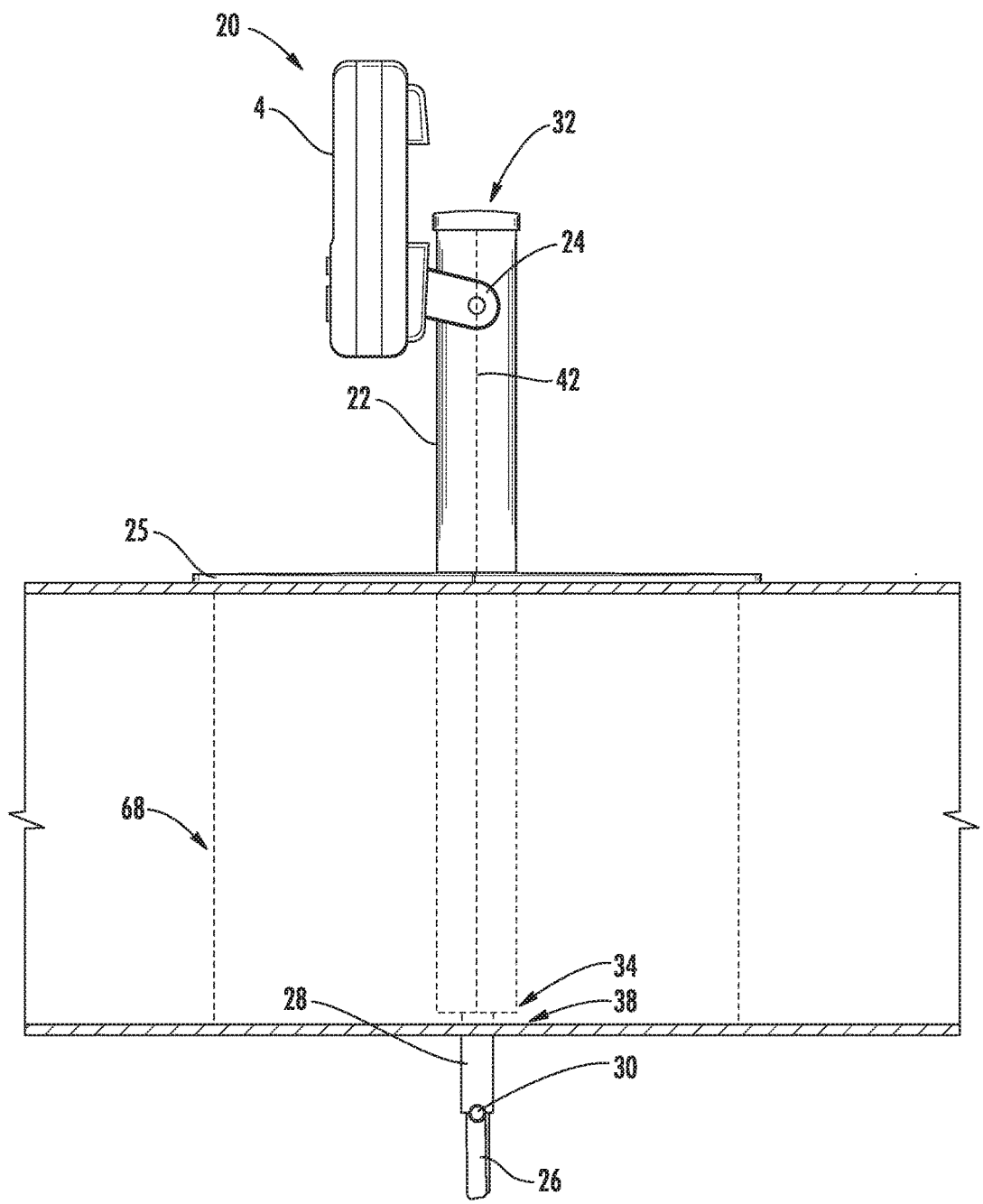
Figure 7:
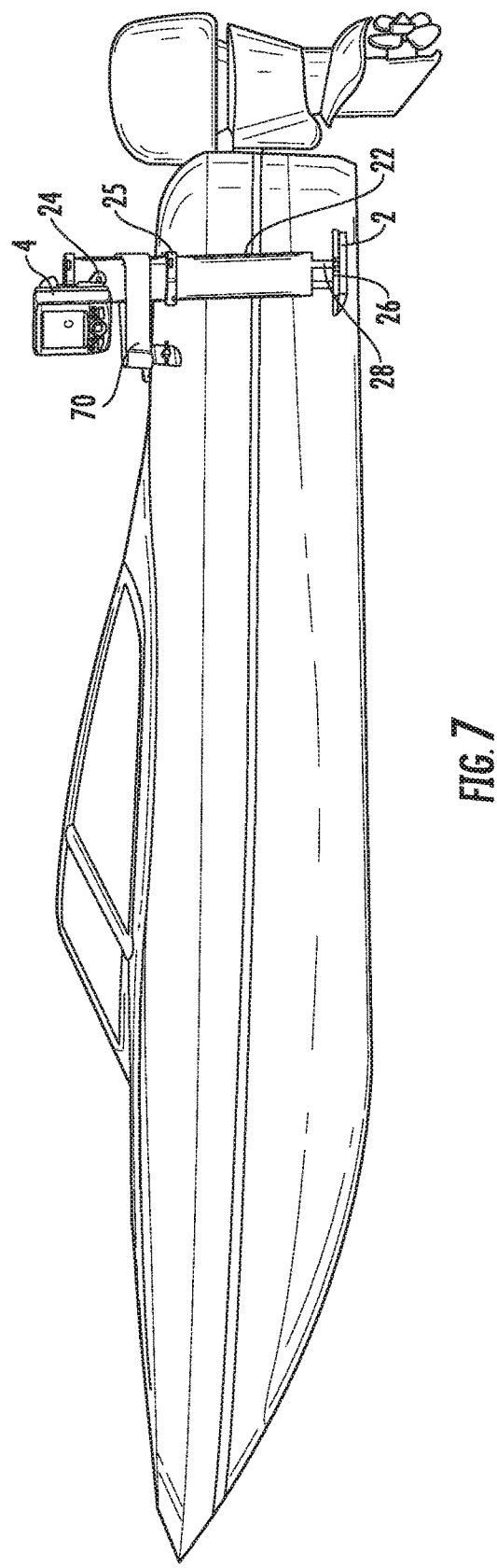
Figure 8:
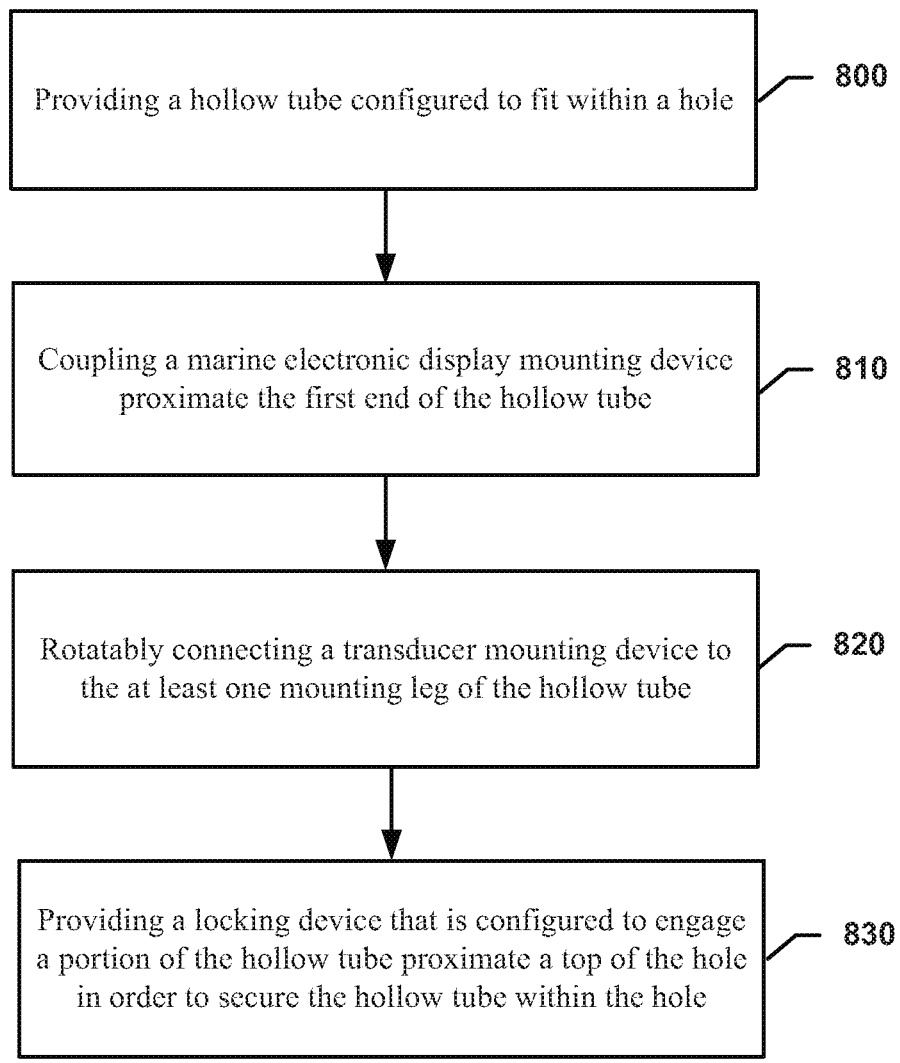

Having thus described the invention in general terms, reference will now be made to the accompanying drawings, which are not necessarily drawn to scale, and wherein:

FIG. 1 illustrates an example system for separately mounting a transducer and a marine electronic display on a kayak;

FIG. 2 illustrates an example mounting assembly according to various embodiments described herein;

FIG. 3 illustrates an example mounting assembly, wherein a transducer mounting device of the mounting assembly is in a first position, in accordance with various embodiments described herein;

FIG. 4 illustrates the example transducer mounting device of the mounting assembly shown in FIG. 3, wherein the transducer mounting device is in a second position, in accordance with various embodiments described herein;

FIGS. 5A-5C illustrate additional example mounting assemblies according to various embodiments described herein;

FIG. 6 illustrates another example mounting assembly mounted through a hole, in accordance with various embodiments described herein;

FIG. 7 illustrates yet another example mounting assembly mounted over the side of a watercraft, in accordance with various embodiments described herein; and FIG. 8 illustrates an example flowchart of a method of manufacturing a mounting assembly according to various embodiments described herein.

DETAILED DESCRIPTION

Exemplary embodiments of the present invention now will be described more fully hereinafter with reference to the accompanying drawings, in which some, but not all embodiments of the invention are shown. Indeed, the invention may be embodied in many different forms and should not be construed as limited to the exemplary embodiments set forth herein; rather, these embodiments are provided so that this disclosure will satisfy applicable legal requirements. Like reference numerals refer to like elements throughout.

Some example embodiments of the present invention provide a mounting assembly that can effectively mount a transducer and a marine electronic display via the same mounting assembly. Additionally, in order to mount the mounting assembly, the mounting assembly may be configured to utilize a hole (e.g., a scupper hole of a kayak) without the need for any additional fastening elements (e.g., screw or bolts). Even further, the mounting assembly may be configured to mount on the surface or in a hole of a watercraft. It should be understood that the term "watercraft", as used herein, may include, but is not limited to, boats, kayaks, canoes, or the like.

Accordingly, the user may put the mounting assembly through the hole or attach it to a side of the watercraft, and then attach the marine electronic display and transducer to the appropriate components of the mounting assembly. Thereby, the mounting of a transducer and a marine electronic display into the hole or onto the watercraft will take less time and require less parts. In some embodiments, no holes are required to be drilled into the watercraft or proximate the hole and no additional fastening elements are required to be attached or inserted into the hole or watercraft in order to mount either the marine electronic display or the transducer.

Accordingly, example embodiments described herein provide for the mounting of a mounting assembly onto a surface of a watercraft or via a hole (e.g., an ice fishing hole, a scupper hole, etc.).

FIG. 1 illustrates an example of a system that includes separate mounting assemblies for a transducer 2 and a marine electronic display 4 on a kayak 6. As shown in FIG. 1, the transducer mounting assembly utilizes a scupper hole 8 in the kayak 6. In some cases, in order to secure the mounting assembly within the scupper hole 8, the transducer mounting assembly may be screwed into or otherwise fixed on a bottom surface of the kayak 6. Accordingly, the user may have to drill holes in the bottom surface of the kayak 6 to fix the mounting assembly thereto. In some cases, the transducer mounting assembly may embody the transducer 2, or the transducer 2 may otherwise be permanently attached to the transducer mounting assembly. Accordingly, the transducer 2 may also be fixed onto the bottom surface (or any surface of the kayak 6 as determined by the user of the kayak 6). Thus, whenever the kayak 6 is being transported, dry docked, or is not in use, the user may find it difficult to remove the transducer 2 from the kayak 6 for safekeeping.

As shown in FIG. 1, when the transducer 2 is mounted on the kayak 6 via the scupper hole 8, a cap 10 may be placed over the scupper 8 hole effectively sealing off the scupper hole 8. Typically, scupper holes 8 enable any water coming over the deck of the kayak 6 to drain out thereby providing a safety feature so the kayak 6 does not capsize. However, when the cap 10 is placed over a top surface of the scupper hole 8, the scupper hole 8 effectively loses its safety benefit, and water may be allowed to sit in the buoyant area of the kayak 6. In some embodiments, holes may be made into the cap, or a slot may be made in the hollow tube 22 (described below), to enable water to pass through and out of the scupper hole.

As shown in FIG. 1, the marine electronic display 4 may be separately mounted to the kayak 6 via suction, adhesives, or various fastening elements in a separate location of the kayak 5. In order to connect the transducer 2 to the marine electronic display 4, cables may be run (such as through holes in the cap or via a drilled hole in the deck of the kayak 6). In order to power the transducer 2 and the marine electronic display 4, a battery may be placed in the front (or other portion) of the kayak 6.

Accordingly, the system of FIG. 1 includes a separate mounting for the transducer 2 and the marine electronic display 4, which requires more time and effort on the user of the kayak 6, more space in the kayak 6, and more considerations, including management of cables.

FIG. 2 illustrates an example embodiment of a mounting assembly 20 that is configured to mount both the marine electronic display 4 and the transducer 2 onto the kayak 6 via the scupper hole 8. As shown in FIG. 2, the mounting assembly 20 may be mounted within the scupper hole 8 of the kayak 6. Even though the mounting assembly 20 utilizes the scupper hole 8 of the kayak 6, the scupper hole 8 may maintain its intended safety function of enabling water coming into the kayak 6 to drain out.

As shown in FIG. 2, the mounting assembly 20 may include a hollow tube 22, a marine electronic display mounting device 24, a transducer mounting device 26, and at least one mounting leg 28. The scupper hole 8 may have a predefined diameter 60. The hollow tube may have a predefined diameter 62 that is less than the predefined diameter 60 of the scupper hole 8, thus enabling the hollow tube 22 to fit within the scupper hole 8. Moreover, the hollow tube 22 may have or define a first end 32 and a second end 34. The hollow tube 22 may also have a predefined length such that the first end 32 of the hollow tube 22 is disposed above the top surface 36 of the scupper hole 8 and such that the second end 34 rests within an inside or interior of the scupper hole 8 proximate a bottom surface 38 of the scupper hole 8. In some cases, the second end 34 of the hollow tube 22 may rest flush with the bottom surface 38 of the scupper hole 8 or proximate an exterior or outside of the scupper hole 8.

A marine electronic display mounting device 24 may be configured to removably receive and mount the marine electronic display 4. The marine electronic display 4, as described herein, may be an LCD display and may be configured to present or indicate one or more sets of data or combinations of data (e.g., depth, sonar, temperature, weather, GPS, fish location, bottom surface topography, or any other relevant information to the user). The marine electronic display 4 may also include a user interface in order for the user to program or interact with the marine electronic display 4.

The marine electronic display mounting device 24 may be coupled proximate the first end 32 of the hollow tube 22. However, in other example embodiments, the user, based on the position the user wishes to place the marine electronic display 4 in, may move the marine electronic display mounting device 24 anywhere between a top surface 36 of the scupper hole and the first end 32 of the hollow tube 22. In some cases, the marine electronic display mounting device 24 may be a locking, quick-release bracket so that the user may quickly and easily connect and disconnect the marine electronic display 4 from the marine electronic display mounting device 24. In other example embodiments, the marine electronic display mounting device 24 may be any other suitable fastener that allows the user to remove and mount the marine electronic display 4 so that the user may take the marine electronic display 4 with them whenever the kayak 6 is being stored, transported, or not in use. Accordingly, in order for the user of the kayak 6 to ensure the safekeeping of the marine electronic display 4, the user may easily and quickly remove and remount the marine electronic display 4 via the marine electronic display mounting device 24.

The hollow tube 22 may define or have at least one mounting leg 28 proximate the second end 34 of the hollow tube 22 in order to connect or couple the transducer mounting device 26 to the hollow tube 22. As shown in FIG. 2, two mounting legs 28 are integral to or built-in to the second end 34 of the hollow tube 22 in order to couple the transducer mounting device 26 to the hollow tube 22. However, in other example embodiments, more or less than two mounting legs 28 may be integral to the second end 34 of the hollow tube 22 in order to couple the transducer mounting device 26 thereto. The mounting legs 28 may be rotatable and configured to enable rotation of the transducer mounting device 26, as described in further detail below.

As shown in FIG. 2, the mounting assembly 20 may also include the transducer mounting device 26 which is configured to removably receive and mount at least one transducer 2. The transducer 2 may be configured to transmit sound waves into a body of water, and thus when the sound waves strike anything of differing acoustic impedance (e.g., the sea floor or something suspended in the water above the bottom), the sound waves reflect or echo off that object. These echoes or sonar returns may strike the transducer 2 which will then convert the echoes back into an electrical signal which is sent to the marine electronic display 4.

Depending on the type or shape of the transducer 2 used, various sound beam configurations may be transmitted into the water by the transducer 2. For example, the transducer 2 may transmit fan-shaped sound beams (e.g., beams created from one or more rectangular transducers). However, in other example embodiments, the transducer 2 may be configured to transmit conical shaped, multiple conical shaped, or the like beams. Further information regarding different sonar transmissions is described in U.S. patent application Ser. No. 12/460,139, entitled "Downscan Imaging Sonar," filed Jul. 14, 2009, U.S. patent application Ser. No. 12/460,093, entitled "Circular Downscan Imaging Sonar," filed Jul. 14, 2009, U.S. patent application Ser. No. 14/717,458, entitled "Sonar Systems and Methods Using Interferometery and/or Beamforming for 3D Imaging," filed May 20, 2015, and U.S. patent application Ser. No. 13/370,633, entitled "Sonar Assembly for Reduced Interference," filed Feb. 10, 2012, the entire disclosures of which are hereby incorporated by reference in their entireties.

In some cases, the transducer 2 may include a transducer housing for housing an active element of the transducer 2. The active element in the transducer 2 may include at least one man-made crystal (e.g., lead zirconate or barium titanate), and a conductive coating may applied to two sides of the crystal. Wires may be soldered to these coatings so the crystal can be attached to a cable which transfers the electrical energy from a transmitter of the transducer 2 to the crystal. When the frequency of the electrical signal is the same as the mechanical resonant frequency of the crystal, the crystal moves, creating sound waves at that frequency. The shape of the crystal may determine both its resonant frequency and cone angle. In some example embodiments, more than one crystal may be used to create increased or enhanced sound wave coverage. Moreover, in some embodiments, more than one transducer 2 is used to create increased or enhanced sound wave coverage.

It should be understood that the transducer 2 may come in all shapes and sizes. Most transducer housings are made from plastic, but may be made from bronze. In some cases, the size and shape of the transducer housing may be determined by the size of the crystal inside. Moreover, the transducer housing may be shaped such that a smooth laminar flow of water over the face of the housing of the transducer 2 is created so as to not create acoustical noise which can interfere with the returned echoes.

In some cases, a surface of the housing of the transducer 2 may have an engagement feature or apparatus and that is configured to removably engage or couple with the transducer mounting device 26 whenever the mounting assembly 20 has been mounting within the scupper hole 8. Accordingly, a surface of the transducer mounting device 26, for example a second surface that lies most proximate the housing of the transducer 2, may include a corresponding engagement feature that corresponds to and is configured to engage with an engagement feature or apparatus of the housing of the transducer 2. The engagement feature of the transducer mounting device 26 and the housing of the transducer 2 may be configured to engage in various different ways including but not limited to clamping, fastening, adhering, snap fit, or any other type of engagement feature. Thus, the transducer 2 may be easily removed from and recoupled to the transducer mounting device 26 whenever the kayak 6 is being transported, dry docked, or is otherwise not in use. Thereby, the user of the kayak 6 may ensure that the transducer 2 is properly removed and stored for safekeeping when the kayak 6 is not in use.

The transducer mounting device 26 may have an opening that extends vertically or longitudinally through the surface of the transducer mounting device 26 to allow at least one cable to pass through. In some cases, one of the cables may be configured to connect the transducer 2 to the marine electronic display 4. Moreover, a second cable may extend from a battery to the marine electronic display 4 and the transducer 2. The opening in the transducer mounting device 26 may be located proximate an edge of the transducer mounting device 26. However, in some example embodiments, the opening may be located in other locations of the transducer mounting device 26, such as in the center of the transducer mounting device 26.

As mentioned above, the mounting legs 28 may enable rotation of the transducer mounting device 26. In particular, the mounting legs 28 may enable the transducer mounting device 26 to rotate between a first position and a second position. When the transducer mounting device 26 is in the first position, the transducer mounting device 26 is prevented from being pulled through the scupper hole 8 when the transducer mounting assembly 2 is mounted within the scupper hole 8. Moreover, when the transducer mounting device 26 is in the second position, the transducer mounting device 26 is enabled to pass through the scupper hole 8 of the kayak 6 in order to mount the mounting assembly 20 therein.

FIG. 3 illustrates an example embodiment of a transducer mounting device 26 that is in the first position. As shown in FIG. 3, the transducer mounting device 26 may have a predetermined length such that when the transducer mounting device 26 is in the first position, the transducer mounting device 26 is prevented from being pulled through the scupper hole 8. In other words, the length of the body of the transducer mounting device 26 may be greater than a diameter 60 of the scupper hole 8, and thereby the diameter 62 of the hollow tube 22, such that when the transducer mounting device 26 is in the first position, the body of the transducer mounting device 26 may be prevented from being pulled through the scupper hole 8. Moreover, when the transducer mounting device 26 is in the first position, a longitudinal axis 40 of the transducer mounting device 26 extends perpendicular to a longitudinal axis 42 of the hollow tube 22 (see FIG. 2). In other words, a first surface of the transducer mounting device 26 lies proximate the second end 34 of the hollow tube 22.

FIG. 4 illustrates an example embodiment of a transducer mounting device 26 that is in the second position. As shown in FIG. 4, the transducer mounting device 26 may have a predetermined width such that when the transducer mounting device 26 is in the second position, the transducer mounting device 26 may be pulled or threaded through the scupper hole 8. In other words, the width of the body of the transducer mounting device 26 may be less than the diameter 60 of the scupper hole 8 and the diameter 62 of the hollow tube 22, such that when the transducer mounting device 26 is in the second position, the body of the transducer mounting device 26 may be enabled to be pulled through the scupper hole 8. Moreover, when the transducer mounting device 26 is in the second position, the longitudinal axis 40 of the transducer mounting device 26 may extend parallel to the longitudinal axis 42 of the hollow tube 22 (see FIG. 2). In other words, a portion of the first surface of the transducer mounting device 26 may lie proximate a body portion of the hollow tube 22.

In order to mount the mounting assembly 20 within the scupper hole 8, the transducer mounting device 26 may be rotated to the second position, such that the mounting assembly 20 is enabled to pass through the scupper hole 8 of the kayak 6. In other words, the transducer mounting device 26 is sized to fit within the scupper hole 8 when the transducer mounting device 26 is in the second position such that the transducer mounting device 26 may be passed through the scupper hole 8 with the hollow tube 22 to a position past the bottom of the scupper hole 8 so as to enable the transducer mounting device 26 to rotate to the first position. Accordingly, once the transducer mounting device 26 of the mounting assembly 20 passes the bottom surface 38 of the scupper hole 8, the transducer mounting device 26 may be moved to the first position such that the transducer mounting device is prevented from being pulled through the scupper hole 8.

As explained above, once the transducer mounting device 26 passes a bottom surface 38 of the scupper hole 8, the transducer mounting device 26 may be rotated to the first position. To ensure that the transducer mounting device 26 stays in the first position or, in other words, in order to prevent unwanted movement of the transducer mounting device 26, the mounting assembly 20 may also include a fastening element 30. The fastening element 30 may be coupled to the transducer mounting device 26 in order to secure the transducer mounting device 26 in the first position. Thus, the user may tighten or untighten the fastening element 30 in order to rotate the transducer mounting device 26 between the first position and the second position. Accordingly, if the user wished to remove the mounting assembly 20, the user would untighten the fastening element 30 and rotate the transducer mounting device 26 to the second position.

In some example embodiments, a locking device 25 (see FIG. 2), such as a bolt, nut, or the like, may be tightened around a threaded portion of the hollow tube 22 in order assist in maintaining the position of the hollow tube 22 in the scupper hole 8. In some cases, a protective cap may be positioned around the locking device 25 for protective purposes (e.g., preventing damage to kayak 6, etc.) The locking device 25 may engage the top surface 36 of the scupper hole 8, and the transducer mounting device 26 in the first position may engage a bottom surface 38 of the scupper hole in order to secure the mounting assembly 20 within the scupper hole 8 without the use of fasteners or adhesives being placed in or attached to the kayak 6 directly. In other words, no holes will have to be drilled in the kayak 6 in order to mount the mounting assembly 20 within the scupper hole 8 of the kayak 6. Instead, the locking device 25 and the transducer mounting device 26 in the first position work together to maintain an interference or "clamp" fit of the mounting assembly 20 within the scupper hole 8. The user may attach the transducer 2 to the transducer mounting device 26, and the user may attach the marine electronic display 4 to the marine electronic display mounting device 24. In order to attach the transducer 2 and the marine electronic display 4, a cable may run inwardly down the length or longitudinal axis 42 of the hollow tube 22. In particular, a first end of the cable may be connected to the transducer 2, and then the cable may pass through the opening of the transducer mounting device 26 such that a second end of the cable may be connected to the marine electronic display.

In some cases, a battery may also be disposed in the interior of the hollow tube 22. The battery may be cylindrical shaped such that the battery fits within the hollow tube 22. A battery cable may then be connected to the marine electronic display 4 and/or the transducer 2 in order to power one or both of the marine electronic display 4 and the transducer 2. In particular, a first cable of the battery may run from the battery to the transducer 2 and a second cable of the battery may run from the battery to the marine electronic display 4. In some cases, the first cable of the battery may also be threaded through the opening of the transducer mounting device 26 in order to connect to the transducer 2. By placing the battery in the interior of the hollow tube, the battery does not need to be placed in the front (or other position) of the kayak 6 in order to power the transducer 2 and the marine electronic display 4.

In other example embodiments, the battery may be disposed on top of or on a side of the hollow tube. Regardless, if the battery is disposed within, on the top, or on the side of the hollow tube, the battery may be secured by a tray, hanger, hook, hook-and-loop fasteners, zip ties, or the like. Additionally, in some embodiments, in order to manage left over (or excess) cable running from the battery to the marine electronic display 4 and the transducer 2, the cables may be secured by one or more hooks, hook-and-loop fasteners, zip ties, or the like. For example, two spaced apart hooks could be positioned on an external (or internal) side of the hollow tube 22. A user could wind the excess cable around the two hooks (in a loop fashion) to store the excess cable.

FIGS. 5A-5C illustrate various example embodiments of the mounting assembly 20 in which the transducer 2 is configured to be rotatable. As shown in FIG. 5A, the mounting assembly 20, as described in the above example embodiments, may include a hollow tube 22, a marine electronic display mounting device 24, a transducer mounting device 26, at least one mounting leg 28, and a locking device 25. However, the mounting assembly 20 may also include a rod 50 and a rotatable cap 52. The rod 50 may be disposed in the interior of the hollow tube 22 and extend down the longitudinal length of the hollow tube 22.

In some cases, the rod 50 may extend from above or proximate the first end 32 of the hollow tube 22 down past the second end 34 of the hollow tube 22, such that an end of the rod 50 extends past the bottom surface 38 of the scupper hole 8. A first end of the rod 50 may be attached to the rotatable cap 52, and the rod 50 may pass through an opening of the transducer mounting device 26 such that a second end of the rod 50 attaches to the transducer 2 (or, in some cases, the housing of the transducer 2). In some cases, the opening of the transducer mounting device 26 may be disposed at or proximate the center of the transducer mounting device 26.

In some cases, the rod 50 may be hollow, and the cable that attaches the transducer 2 and the marine electronic display 4 may run through an interior of the hollow rod 50 in order to couple the transducer 2 and the marine electronic display 4. The battery may also be located in the interior of the rod 50, or as described above, may be located within the interior of the hollow tube 22.

In some cases, the rotatable cap 52 may be a rotatable lever, or in some example embodiments, the rotatable cap 52 may include a lever to easily enable the user to rotate the rotatable cap 52. Accordingly, when the rotatable cap 52 is rotated by the user, the rotatable cap 52 may cause a corresponding rotation of the rod 50. In response to rotation of the rod 50, the transducer 2 may also rotate in a corresponding manner. In some example embodiments, if the rotatable cap 52 is rotated such that the rod 50 rotates about an axis of rotation (e.g., circular rotation), the rod 50 may cause a corresponding circular rotation of the transducer 2.

As shown in FIGS. 5B and 5C, in some cases, the mounting assembly may also be configured such that the user may rotate or pivot the rotatable cap 52 (or portions thereof) vertically relative to a longitudinal axis of the rod 50. In embodiments, the mounting assembly may include a first rod 50 and a second rod 58. The first rod 50 may stay fixed vertically, while the second rod 58 is configured to enable the vertical tilt of the transducer mounting device 26 and the transducer 21. For example, the second rod 58 may be configured to be pulled or pushed vertically to cause the transducer 2 to tilt vertically with respect to a rotational axis (see e.g., the up and down curved arrows in FIG. 5C). In this regard, in some embodiments, vertical rotation or pivotal movement of the rotatable cap 52 may cause a corresponding vertical rotation or pivotal movement of the transducer 2 (or a portion thereof) such that the transducer 2 tilts. In some embodiments where vertical rotation or pivotal movement of the transducer 2 is enabled, the transducer mounting device 26 may include a hinge (such as between two plates) at an end of the transducer mounting device 26 to facilitate tilting of the transducer 2. In some embodiments, the vertical rotation or pivotal movement of the rotatable cap 52 (or portions thereof) may enable the transducer 2 to be tilted into a position such that it is removable (such as for security or storage). In such embodiments, the tilting feature can be accomplished from inside the kayak.

In some embodiments, as shown in FIG. 5A, because the rod 50 is fixed only to the rotatable cap 52 and the transducer 2, neither the transducer mounting device 26 nor the marine electronic display mounting device 24 may rotate in response to rotation of the rotatable cap 52 by the user. Accordingly, the marine electronic display mounting device 24 may stay in the position set by the user. Therefore, the user can adjust the location of the transducer 2 while maintaining the position of both the transducer mounting device 26 and the marine electronic display mounting device 24. In some cases, such as described above, the rod may be attached to the transducer mounting device (or a portion of the transducer mounting device 26) such that the transducer mounting device 26 or a portion thereof is configured to rotate with the rod 50.

FIG. 6 illustrates an example embodiment of a mounting assembly 20 that is configured to mount both the marine electronic display 4 and the transducer 2 into a hole 68. In some cases, the hole 68 may be an ice fishing hole or the like. The mounting assembly 20 shown in FIG. 6 may be configured in accordance with example embodiments described herein. However, as shown in FIG. 6, the locking device may be sized such that the position of the hollow tube 22 is maintained in the hole 68. For example, the larger the diameter of the holder, the larger the diameter (or size) of the locking device (which is shown as a plate 25). Though the above described example shows a locking device as a plate, in some embodiments, the plate may not be a locking device and could simply be a plate. Likewise, other locking devices could be used. Further, in other example embodiments, the locking device 25 may have a smaller diameter than the hole 68, and the position of the hollow tube 22 may be maintained in the hole 68 by a separate hole mounting apparatus. The hole mounting apparatus may, for example, be a hook for mounting the mounting assembly 20 to a side of the hole 68 or the like.

FIG. 7 illustrates an example embodiment of a mounting assembly 20 that is configured to mount both the marine electronic display 4 and the transducer 2 relative to a surface of a watercraft such as boat. The mounting assembly 20 may be configured in accordance with example embodiments described herein. However, because the mounting assembly 20 does not utilize a hole for mounting, the mounting assembly 20 may be mounted off of or from a side of the boat via a mounting bracket 70. The mounting bracket 70 may be mounted at a first end of the mounting bracket to a surface of the boat and at a second end around the hollow tube 22.

FIG. 8 illustrates a control flow diagram of a method of manufacturing the mounting assembly 20 described herein. As shown in FIG. 8, the method may include providing a hollow tube configured to fit within a hole, at operation 800. At operation 810, the marine electronic display mounting device may be coupled proximate the first end of the hollow tube. At operation 820, the transducer mounting device may be rotatably connected to the at least one mounting leg of the hollow tube. Then, at operation 830, the locking device may be provided that is configured to engage a portion of the hollow tube proximate the top of the hole in order to secure the hollow tube within the hole. Accordingly, example embodiments described herein may provide for a mounting assembly that is configured to mount both a transducer and a marine electronic display in the hole. Moreover, further example embodiments described herein may provide for a mounting assembly that is configured to mount both a transducer and a marine electronic display from a surface of the watercraft (such as described above).

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

The invention claimed is:

1. A mounting assembly comprising:
   a hollow tube configured to fit within a hole, wherein the hollow tube defines a first end, a second end, and a first axis, wherein the hollow tube further defines at least one mounting leg proximate the second end;
   a marine electronic display mounting device coupled proximate the first end of the hollow tube, wherein the marine electronic display mounting device is configured to removably receive and mount a marine electronic display;
   a transducer mounting device rotatably connected to the at least one mounting leg, wherein the transducer mounting device is configured to rotate about a second axis between a first position and a second position, wherein the second axis is perpendicular to the first axis, wherein the transducer mounting device is further configured to removably receive and mount at least one transducer, wherein the transducer mounting device is sized to fit within the hole when the transducer mounting device is in the second position such that the transducer mounting device can be passed through the hole with the hollow tube to a position past a bottom of the hole so as to enable the transducer mounting device to rotate to the first position; and
   a locking device that is configured to engage a portion of the hollow tube proximate a top of the hole in order to secure the hollow tube within the hole.

2. The mounting assembly of claim 1, wherein when the transducer mounting device is in the first position, a longitudinal axis of a body of the transducer mounting device is perpendicular to a longitudinal axis of the hollow tube, and wherein a length of the body of the transducer mounting device is greater than a diameter of the hole such that when the transducer mounting device is in the first position, the body of the transducer mounting device is prevented from being pulled through the hole.

3. The mounting assembly of claim 2, wherein when the transducer mounting device is in the second position, the longitudinal axis of the body of the transducer mounting device is parallel to the longitudinal axis of the tube, and wherein a width of the body of the transducer mounting device is less than the diameter of the hollow tube such that when the transducer mounting device is in the second position, the body of the transducer mounting device is enabled to pass through the hole.

4. The mounting assembly of claim 1, wherein the locking device and the transducer mounting device engage a top and a bottom of the hole respectively to secure the mounting assembly within the hole without the use of fasteners or adhesives.

5. The mounting assembly of claim 1, wherein the transducer mounting device defines an opening to enable a cable of the transducer mounted thereto to be passed through the opening into an interior of the hollow tube and to a marine electronic display mounted to the marine electronic display mounting device.

6. The mounting assembly of claim 1, wherein the hollow tube is configured to enable a battery to be mounted within an interior of the hollow tube.

7. The mounting assembly of claim 1, wherein the hollow tube is configured to enable a battery to be mounted on an exterior surface of the hollow tube via at least one of a tray, a hanger, a hook, a hook-and-latch fastener, or a zip tie.

8. The mounting assembly of claim 1 further comprising:
a rotatable cap positioned on the first end of the hollow tube, and
a rod positioned within an interior of the hollow tube and defining a first end and a second end, wherein the first end of the rod is operably coupled to the rotatable cap, wherein the second end of the rod is configured to be coupled to a transducer, wherein the transducer is rotatably mounted to the transducer mounting device, and wherein, in response to the rotatable cap being rotated by a user, the rod rotates about an axis of rotation to cause a corresponding rotation of the transducer.

9. The mounting assembly of claim 8, wherein the rod is a hollow rod.

10. A system comprising:
a mounting assembly comprising:
a hollow tube configured to fit within a hole, wherein the hollow tube defines a first end, a second end, and a first axis, wherein the hollow tube further defines at least one mounting leg proximate the second end;
a marine electronic display mounting device coupled proximate the first end of the hollow tube, wherein the marine electronic display mounting device is configured to removably receive and mount a marine electronic display;
a transducer mounting device rotatably connected to the at least one mounting leg, wherein the transducer mounting device is configured to rotate about a second axis between a first position and a second position, wherein the second axis is perpendicular to the first axis, wherein the transducer mounting device is further configured to removably receive and mount at least one transducer, wherein the transducer mounting device is sized to fit within the hole when the transducer mounting device is in the second position such that the transducer mounting device can be passed through the hole with the hollow tube to a position past a bottom of the hole so as to enable the transducer mounting device to rotate to the first position; and
a locking device that is configured to engage a portion of the hollow tube proximate a top of the scupper hole in order to secure the hollow tube within the hole;
at least one transducer mounted to the transducer mounting device; and
a marine electronic display mounted to the marine electronic display mounting device.

11. The system of claim 10, wherein when the transducer mounting device is in the first position, a longitudinal axis of a body of the transducer mounting device is perpendicular to a longitudinal axis of the tube, and wherein a length of the body of the transducer mounting device is greater than a diameter of the hole such that when the transducer mounting device is in the first position, the body of the transducer mounting device is prevented from being pulled through the hole.

12. The system of claim 11, wherein when the transducer mounting device is in the second position, the longitudinal axis of the body of the transducer mounting device is parallel to the longitudinal axis of the hollow tube, and wherein a width of the body of the transducer mounting device is less than the diameter of the hollow tube such that when the transducer mounting device is in the second position, the body of the transducer mounting device is enabled to pass through the hole.

13. The system of claim 10, wherein the locking device and the transducer mounting device engage a top and a bottom of the hole respectively to secure the mounting assembly within the hole without the use of fasteners or adhesives.

14. The system of claim 10, wherein the transducer mounting device defines an opening to enable a cable of the transducer mounted thereto to be passed through the opening into an interior of the hollow tube and to a marine electronic display mounted to the marine electronic display mounting device.

15. The system of claim 10, wherein the mounting assembly further comprises:
a rotatable cap positioned on the first end of the hollow tube, and
a rod positioned within an interior of the hollow tube and defining a first end and a second end, wherein the first end of the rod is operably coupled to the rotatable cap, wherein the second end of the rod is configured to be coupled to the transducer, wherein the transducer is rotatably mounted to the transducer mounting device, and wherein, in response to the rotatable cap being rotated by a user, the rod rotates about an axis of rotation and is configured to cause a corresponding rotation of the transducer.

16. The system of claim 15, wherein the rod is a hollow rod.

17. A mounting assembly comprising:
a hollow tube configured to fit within a hole, wherein the hollow tube defines a first end and a second end, wherein the hollow tube further defines at least one mounting leg proximate the second end;
a marine electronic display mounting device coupled proximate the first end of the hollow tube, wherein the marine electronic display mounting device is configured to removably receive and mount a marine electronic display;
a transducer mounting device rotatably connected to the at least one mounting leg, wherein the transducer mounting device is configured to rotate, wherein the transducer mounting device is further configured to removably receive and mount at least one transducer;
a rotatable cap positioned on the first end of the hollow tube; and a rod positioned within an interior of the hollow tube and defining a first end and a second end, wherein the first end of the rod is operably coupled to the rotatable cap, wherein the second end of the rod is configured to be coupled to the at least one transducer, and wherein, in response to the rotatable cap being rotated by a user, the rod rotates about an axis of rotation to cause a corresponding rotation of the at least one transducer.

18. The mounting assembly of claim 17, wherein the rod is a hollow rod.

19. The mounting assembly of claim 17 further comprising a locking device that is configured to engage a portion of the hollow tube proximate a top of the hole in order to secure the hollow tube within the hole.

* * * * *